UNITED STATES PATENT OFFICE.

ALOIS SCHAIDHAUF, OF FRANKFORT-ON-THE-MAIN, GERMANY, ASSIGNOR TO ROESSLER & HASSLACHER CHEMICAL COMPANY, OF NEW YORK, N. Y., A CORPORATION OF NEW YORK.

PROCESS OF MANUFACTURING ALKALI-METAL PERCARBONATE.

1,225,722.  Specification of Letters Patent.  Patented May 8, 1917.

No Drawing.   Application filed January 16, 1917.  Serial No. 142,752.

*To all whom it may concern:*

Be it known that I, ALOIS SCHAIDHAUF, a subject of the German Emperor, and resident of Frankfort-on-the-Main, Germany, have invented certain new and useful Improvements in Processes of Manufacturing Alkali-Metal Percarbonate, of which the following is a specification.

My invention relates to the manufacture of alkali metal percarbonate, and in particular to the manufacture of sodium percarbonate. It is the object of my invention to provide improvements in the manufacture of alkali metal percarbonates, whereby I am enabled to obtain an excellent yield of a product which shows a satisfactory stability when stored, and contains a good proportion of active oxygen.

The efforts made to transform the strong solutions of hydrogen peroxid which, nowadays, have become an article of the wholesale trade, into percarbonate have failed to produce a satisfactory result owing to the inability to obtain stable persalts. I have made experiments to produce percarbonates from sodium carbonate of various origin, and found that the several sorts of sodium carbonate showed remarkable differences, though the same were of the same composition and appeared to show the same degree of purity. Sometimes, fairly good yields could be obtained, and sometimes the products obtained were fairly stable; generally however, the yields as well as the stability of the obtained products were highly unsatisfactory. In the course of the manufacture, I ascertained that the reaction products frequently assumed a greasy character and, hence, difficulties were met in drying the same. In some cases, I observed that the mixture of hydrogen peroxid and sodium carbonate was so rapidly transformed into a greasy and semi-solid condition that all the necessary sodium carbonate could not be incorporated with the hydrogen peroxid.

I have made investigations, using different kinds of commercial sodium carbonate, and found that some sorts of sodium carbonate dissolve clearly and colorless in water, and in other respects, too, convey the impression of being of great purity. However, when such solutions are subjected to the action of heat while air is permitted free access, precipitations are produced in which I have ascertained the presence of iron, and frequently of manganese also. My experiments to remove quantitatively such detrimental constituents from the sodium carbonate by a boiling operation, had no success. However, I have discovered that all the above enumerated impediments can be overcome to a great extent, by subjecting the employed alkali metal carbonate to a calcination or roasting action. The roasting treatment should preferably also be applied when calcined commercial sodium carbonate is employed for the manufacture. Since, however, the different kinds of sodium carbonate are not uniformly influenced by the calcination treatment, I prefer to make preliminary tests on a small scale in each case, to find out the best conditions for the calcination treatment of each sort of sodium carbonate at hand. In a general way, I may say that I employ roasting temperatures within the limits of 400° and 600° centigrade. I prefer to heat the sodium carbonate too much, rather than less than required. I have further discovered that the manufacture of percarbonate from alkali metal carbonate, when the latter is previously subjected to a calcination or roasting process in accordance with my present invention, will be favorably influenced to a considerable extent, when the manufacture is carried out in the presence of stabilizing agents. As such stabilizing agents, the silicates may be employed, for instance, magnesium-silicate, alkali-metal silicate, magnesium-alkali-metal silicate, etc. Other inorganic compounds such as, for instance, magnesium salts, especially chlorid of magnesium, exert a stabilizing effect. Of organic substances, I found gum-arabic to be an advantageous stabilizing agent. The stabilizing agent is best incorporated with the mixtures of reaction. I prefer, to employ several stabilizing agents, which may be of different character; for one product, one being, for instance, applied during the process of manufacture while another is added to the finished product. Thus, a stabilizing agent of an inorganic character may be incorporated with the mixture of reaction during the manufacture, while gum-arabic may be added to the finished salt. Usually, small quantities of the stabilizing agents are required to secure the desired effects.

In manufacturing alkali metal percarbonates, in accordance with my present invention and especially when both measures are applied simultaneously, that is, when the alkali carbonate is previously calcined or roasted, and the process carried out in the presence of stabilizing agents, an excellent yield of a sandy and consequently readily dryable percarbonate can be obtained, having a good proportion of active oxygen and being of good storage stability owing to its freedom from detrimental catalyzers such as iron and manganese oxids, which cause the decomposition of the percarbonate in either its solid form or in solution.

I claim:

1. A process of manufacturing alkali metal percarbonate, consisting in mixing hydrogen peroxid with alkali metal carbonate previously subjected to calcination or roasting treatment in order to destroy detrimental catalysts therein.

2. A process of manufacturing alkali metal percarbonate consisting in mixing hydrogen peroxid with alkali metal carbonate previously subjected to a roasting treatment in order to destroy detrimental catalysts therein, and performing the mixing operation in the presence of at least one stabilizing agent.

3. A process of manufacturing alkali metal percarbonate, consisting in mixing hydrogen peroxid with alkali metal carbonate previously subjected to a roasting treatment in order to destroy detrimental catalysts therein, adding at least one stabilizing agent during the mixing operation and at least one further stabilizing agent to the product of the reaction.

4. A process of manufacturing sodium percarbonate, consisting in mixing hydrogen peroxid with sodium carbonate previously subjected to a roasting treatment in order to destroy detrimental catalysts therein.

5. A process of manufacturing sodium percarbonate, consisting in mixing hydrogen peroxid with sodium carbonate previously subjected to a roasting treatment in order to destroy detrimental catalysts therein, and performing the mixing operation in the presence of at least one stabilizing agent.

6. A process of manufacturing sodium percarbonate consisting in mixing hydrogen peroxid with sodium carbonate previously subjected to a roasting treatment in order to destroy detrimental catalysts therein, performing the mixing operation in the presence of at least one stabilizing agent and adding at least one further stabilizing agent to the product of reaction.

7. A process of manufacturing sodium percarbonate, consisting in mixing hydrogen peroxid with sodium carbonate previously subjected to a roasting treatment in order to destroy detrimental catalysts therein and performing the mixing operation in the presence of stabilizing agents containing silicic acid.

8. A process of manufacturing sodium percarbonate, consisting in mixing hydrogen peroxid with sodium carbonate previously subjected to a roasting treatment in order to destroy detrimental catalysts therein, and performing the mixing operation in the presence of stabilizing agents containing silicic acid and magnesium.

9. A process of manufacturing sodium percarbonate, consisting in mixing hydrogen peroxid with sodium carbonate previously subjected to a roasting treatment in order to destroy detrimental catalysts therein, and performing the mixing operation in the presence of stabilizing agents containing silicic acid, magnesium, and alkali.

10. A process of manufacturing sodium percarbonate, consisting in mixing hydrogen peroxid with sodium carbonate previously subjected to a roasting treatment in order to destroy detrimental catalysts therein, performing the mixing operation in the presence of a stabilizer containing silicic acid, and adding a stabilizing agent of an organic character to the product of reaction.

11. A process of manufacturing sodium percarbonate, consisting in mixing hydrogen peroxid with sodium carbonate previously subjected to a roasting treatment in order to destroy detrimental catalysts therein, performing the mixing operation in the presence of a magnesium-silicate, and adding gum-arabic to the product of reaction.

12. A process of manufacturing sodium percarbonate, consisting in mixing hydrogen peroxid with sodium carbonate previously subjected to a roasting treatment in order to destroy detrimental catalysts therein, performing the mixing operation in the presence of a magnesium-alkali-silicate, and adding gum-arabic to the product of reaction.

In testimony whereof I have signed my name to this specification in the presence of two subscribing witnesses.

ALOIS SCHAIDHAUF.

Witnesses:
VALENTINE WEICHEL,
JEAN GRUND.